("12") United States Patent
Babinot et al.

(10) Patent No.: US 12,034,182 B2
(45) Date of Patent: Jul. 9, 2024

(54) BUSBAR FOR ENERGY STORAGE DEVICE

(71) Applicant: MERSEN FRANCE ANGERS SAS, Verrieres-en-Anjou (FR)

(72) Inventors: Maxime Babinot, Rives du Loir en Anjou (FR); Thomas Fouet, Ornans (FR); Simon Dario, Verrières en Anjou (FR); Jean-François De Palma, St Barthelemy d'Anjou (FR)

(73) Assignee: MERSEN FRANCE ANGERS SAS, Verrieres-en-Anjou (FR)

( * ) Notice: Subject to any disclaimer, the term of this patent is extended or adjusted under 35 U.S.C. 154(b) by 621 days.

(21) Appl. No.: 17/182,346

(22) Filed: Feb. 23, 2021

(65) Prior Publication Data

US 2021/0273298 A1    Sep. 2, 2021

Related U.S. Application Data

(60) Provisional application No. 62/982,380, filed on Feb. 27, 2020.

(30) Foreign Application Priority Data

Jul. 6, 2020 (EP) ..................... 20184291

(51) Int. Cl.
*H01M 50/502* (2021.01)
*H01M 50/204* (2021.01)
(Continued)

(52) U.S. Cl.
CPC ....... *H01M 50/502* (2021.01); *H01M 50/204* (2021.01); *H01M 50/505* (2021.01); *H01M 50/509* (2021.01); *H01M 50/528* (2021.01)

(58) Field of Classification Search
None
See application file for complete search history.

(56) References Cited

U.S. PATENT DOCUMENTS 9,147,875 B1    9/2015  Coakley et al.
2011/0223468 A1  9/2011  Ferber, Jr.
(Continued)

FOREIGN PATENT DOCUMENTS

EP  2 973 782       1/2016
EP  3 131 161 A1    2/2017
(Continued)

OTHER PUBLICATIONS

European Search Report from corresponding European Patent Application No. 20 18 4291, dated Nov. 24, 2020.

*Primary Examiner* — Gregg Cantelmo
(74) *Attorney, Agent, or Firm* — KUSNER & JAFFE

(57) ABSTRACT

A laminated busbar for interconnecting electrical storage devices, comprising an insulating layer and at least one conductive band arranged on the insulating layer, the at least one conductive band comprising a succession of repeating conductor patterns, each conductor pattern defining a cluster having a first terminal and a second terminal for connection to an energy storage device. The laminated busbar also comprises a first terminator coupled to the first terminal and a second terminator coupled to the second terminal, the first and second terminators configured to connect to terminals of the energy storage device.

6 Claims, 7 Drawing Sheets

(51) Int. Cl.
  *H01M 50/505*  (2021.01)
  *H01M 50/509*  (2021.01)
  *H01M 50/528*  (2021.01)

(56) References Cited

U.S. PATENT DOCUMENTS

| | | |
|---|---|---|
| 2014/0212695 A1 | 7/2014 | Lane et al. |
| 2014/0255748 A1* | 9/2014 | Jan ..................... H01M 50/507 429/158 |
| 2015/0072211 A1* | 3/2015 | Nakamura .......... H01M 50/509 429/121 |
| 2017/0018750 A1 | 1/2017 | Wintner |
| 2017/0256769 A1 | 9/2017 | Wynn et al. |
| 2018/0108899 A1 | 4/2018 | Fees et al. |
| 2018/0212222 A1 | 7/2018 | Barton et al. |

FOREIGN PATENT DOCUMENTS

| | | |
|---|---|---|
| EP | 3 249 717 A1 | 11/2017 |
| EP | 3 571 732 | 11/2019 |
| WO | WO-2014/120653 A1 | 8/2014 |
| WO | WO-2014/164560 A1 | 10/2014 |
| WO | WO-2018/134704 A1 | 7/2018 |

* cited by examiner

BUSBAR FOR ENERGY STORAGE DEVICE

CROSS-REFERENCE TO RELATED APPLICATIONS

This application claims the benefit of U.S. Provisional Patent Application No. 62/982,380, filed Feb. 27, 2020, which is incorporated by reference herein in its entirety.

FIELD OF THE INVENTION

The present invention relates generally to battery packs, and more specifically, to busbar for interconnection of energy storage elements of the battery packs.

BACKGROUND OF THE INVENTION

Energy storage systems are used in a variety of contexts, and batteries are a core component of such systems. For example, an electrical storage system can include batteries for storing energy generated from photovoltaics.

Electrical storage devices can also be used in vehicles, such as electric vehicles. A basic unit of an electrical storage system is a battery cell, which comes in several shapes. Cells can be of three common types: pouch, prismatic or cylindrical.

Energy storage systems can include "packs" of multiple cells stacked together. A battery pack is composed of modules, the modules composed of cells. Busbars are used for both modules interconnection and cells interconnection. Cylindrical cell interconnection busbar is an important component of a battery module. Conventional busbar for battery interconnection employs both laminated busbar and/or non-laminated assemblies.

A cell has a given voltage and electrical energy storage capacity, depending on the technology and size of the cell. Therefore, for many applications, individual cells have to be connected together using a busbar in order to build energy storage systems capable of storing and delivering more power than a single battery cell.

Among the existing various types of cells, cylindrical cells are widely used today for their ease of manufacturing and handling. As a non-limiting example, cylindrical cells with standardized sizes known as "size 18500" or "size 21700" are widely used. Each cell may have two accessible electrical poles on their upper end: a first electric pole, which is a protuberance located on the center of one of the disk-shaped end-face of the cell, and a second electric pole, which usually includes a peripheral wall joining the upper end to an opposite lower end. The first electric pole is usually a positive pole, and the second electric pole is usually a negative pole.

The busbar is configured to electrically connect all the cells of an array in series and/or in parallel, as required by the design of the module.

In order to reduce the global cost of a battery pack, the busbar must be easy to produce, and easy to connect due to the large number of individual battery cells that have to be connected.

US-2017256769-A1 describes a busbar with electrical conductors laminated on one side of an insulating layer. The electrical conductors are connected with wires to the electrical poles of each cells, which is time consuming and costly in terms of quality control.

US-2011/223468-A1 describes, on its FIGS. 5, 12 and 13, a laminated busbar for the connection to batteries having each a positive and negative on the same side. However, the precise structure of such busbar is not detailed.

US-2014/212695-A1 describes a busbar with a printed conductive layer, sandwiched between two insulating layers. The production of such busbar is time-consuming.

There is therefore a need for improved busbar for the interconnection of cylindrical cells.

SUMMARY OF THE INVENTION

According to one aspect of the invention, a laminated busbar for interconnecting electrical storage devices includes: an insulating layer; at least one conductive band arranged on the insulating layer, the at least one conductive band comprising a succession of repeating conductor patterns, each conductor pattern defining a cluster having a first terminal and a second terminal for connection to an energy storage device; and a first terminator coupled to the first terminal and a second terminator coupled to the second terminal, the first and second terminators configured to connect to terminals of the energy storage device. Each conductive band is made from pre-stamped metal coil, wherein the insulating layer comprises a top layer and a bottom layer, wherein each conductive band is laminated between the top layer and the bottom layer, the conductive band and the top and bottom layers forming a laminated band, wherein each one of the top and bottom layers comprises openings, configured to allow access to each terminator from both sides of the laminated band. According to the invention, two terminators configured to connect to the same energy storage device define a connection gap, wherein at least one of the top or bottom layers comprises first openings, which are each configured to allow access to a respective connection gap.

The busbar in accordance with the invention is advantageous in that it is optimized for welding (e.g., laser welding) of the positive and negative poles of the battery cells. Only one busbar is required for the cells interconnection, reducing battery module cost, size and weight. Further, the configuration can be easily modified to fit various applications by simply cutting the busbar to a required dimension. At the same time, the single layer conductor is a highly efficient way to interconnect cells, as the single layer minimizes thickness of the busbar.

The repeating electrical conductor patterns are laminated on the same side of an insulating layer and are therefore easier to place, relatively to each other, during manufacturing.

According to advantageous but optional aspects, such a busbar may incorporate one or more of the following features, considered alone or according to any technically allowable combination:
- the at least one conductive band is arranged along a longitudinal axis and comprises two opposite extremity portions,
- wherein each conductor is arranged along a transverse axis, two consecutive conductors being periodically spaced from each other along the longitudinal axis,
- wherein each conductor has the same number of clusters, the clusters of one conductor being arranged along the transverse axis, two consecutive clusters of the same conductor pattern being periodically spaced from each other along the transverse axis.
- wherein all first terminals of the laminated busbar are connectable to a first electric pole of an energy storage device, while all second terminals are connectable to a second electric pole of an energy storage device.

for each conductive band, all the first terminals are oriented toward one of the extremity portion of said conductive band, while all the second terminals are oriented toward the other extremity portion of said conductive band.

each conductor comprises transverse links, each transverse link connecting a cluster of a conductor to the first and second terminals of another cluster of the same conductor.

each conductive band is made from pre-stamped metal coil, wherein the insulating layer comprises a top layer and a bottom layer, wherein each conductive band is laminated between the top layer and the bottom layer, the conductive band and the top and bottom layers forming a laminated band, wherein each one of the top and bottom layers comprises openings, configured to allow access to each terminator from both sides of the laminated band.

two terminators configured to connect to the same energy storage device define a connection gap, wherein at least one of the top or bottom layers comprises first openings, which are each configured to allow access to a respective connection gap.

the first openings are arranged in the top layer, each first opening allowing access to the connection gap between a pair of terminators) configured to be connected to the same energy storage device, each first opening being also configured to allow access to the terminators of said pair.

the bottom layer comprises second and third openings, wherein each second opening allows access to a first terminator of a pair of terminators, so that said first terminator can be weld to the positive pole of said energy storage device, wherein each third opening allows access to a second terminator of said pair, so that said second terminator can be weld to the negative pole of said energy storage device.

each extremity portion is configured, when connected to a respective energy storage device, to have a polarity opposite to the other extremity portion and is configured to connect to a termination conductor or to a junction bar.

The invention also concerns a busbar, comprising a laminated busbar and two termination conductors, wherein the laminated busbar comprises one laminated band, wherein the two extremity portions of said one laminated band are each connected to a respective termination conductor.

According to advantageous but optional aspects, such a busbar may incorporate one or more of the following features, considered alone or according to any technically allowable combination:

the laminated busbar comprises a pair of two laminated bands, two termination conductors and a junction bar, wherein the longitudinal axes of each conductive band of said pair are parallel to each other, wherein at least one conductor and at least one extremity portion of one laminated band of said pair are aligned, along the transverse axis, respectively with a conductor and with an extremity portion of the other conductive band of said pair, wherein the two extremity portions that are aligned with each other along the transverse axis have opposite polarities, wherein the two extremity portions that are aligned along the transverse axis are coupled together by a junction bar, wherein the other two extremity portions are each configured to be coupled to a respective termination conductor.

each laminated band the pair of two laminated bands has the same number of conductor, wherein each conductor of the pair of two laminated bands has the same number of clusters.

According to other aspects:

In accordance with the present invention, provided is a busbar that includes thin single-layer laminated busbar (laminated area) that defines conductive regions of the busbar, and termination conductors for positive and negative connections. Optionally, a junction bar may be included for connecting busbar together, as well as monitoring elements for monitoring a status of the batteries and/or busbar. Additionally, a support structure such as a rigid plate could be added under this busbar to provide mechanical strength and facilitate welding operations.

In one embodiment, the first and second terminators are connected to the at least one conductive band by a mechanical connection or by a welded connection.

In one embodiment, the busbar includes a third terminator corresponding to a positive battery terminal and a fourth terminator corresponding to a negative battery terminal, the third and fourth terminators configured to link the busbar to a subsystem.

In one embodiment, the third and fourth terminators are connected to the at least one conductive band by a mechanical connection or by a welded connection.

In one embodiment, the busbar includes at least one junction bar, wherein the at least one junction bar divides the at least one conductive band into at least two parts.

In one embodiment, the at least one junction bar is connected to the at least one conductive band by a mechanical connection or by a welded connection.

In one embodiment, the busbar includes a monitoring layer arranged between insulation layers.

In one embodiment, the busbar includes two or more monitoring layers arranged between the insulation layers.

In one embodiment, the monitoring layer is operative to provide at least one of temperature monitoring or voltage monitoring.

In one embodiment, the at least one conductive band comprises at least one of copper, aluminum, nickel.

In one embodiment, the at least one conductive band comprises at least one layer of steel.

In one embodiment, a surface of the conductors can be plated, for example, with a metal such as tin, nickel or silver.

In one embodiment, the busbar includes plating formed on at least a portion of the conductive band or the terminators.

In one embodiment, a thickness of the conductive band is between 50 μm and 800 μm.

In one embodiment, the thickness of the conductive band is comprised between 50 μm and 1000 μm.

In one embodiment, a pattern of the at least one conductive band is configured for welding.

In one embodiment, the insulating layer comprises a dielectric film and an adhesive layer.

In one embodiment, the dielectric film comprises polymer.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention may take physical form in certain parts and arrangement of parts, two preferred embodiments of which will be described in detail in the specification and illustrated in the accompanying drawings which form a part hereof, and wherein.

DETAILED DESCRIPTION OF PREFERRED EMBODIMENT

Figure 1:
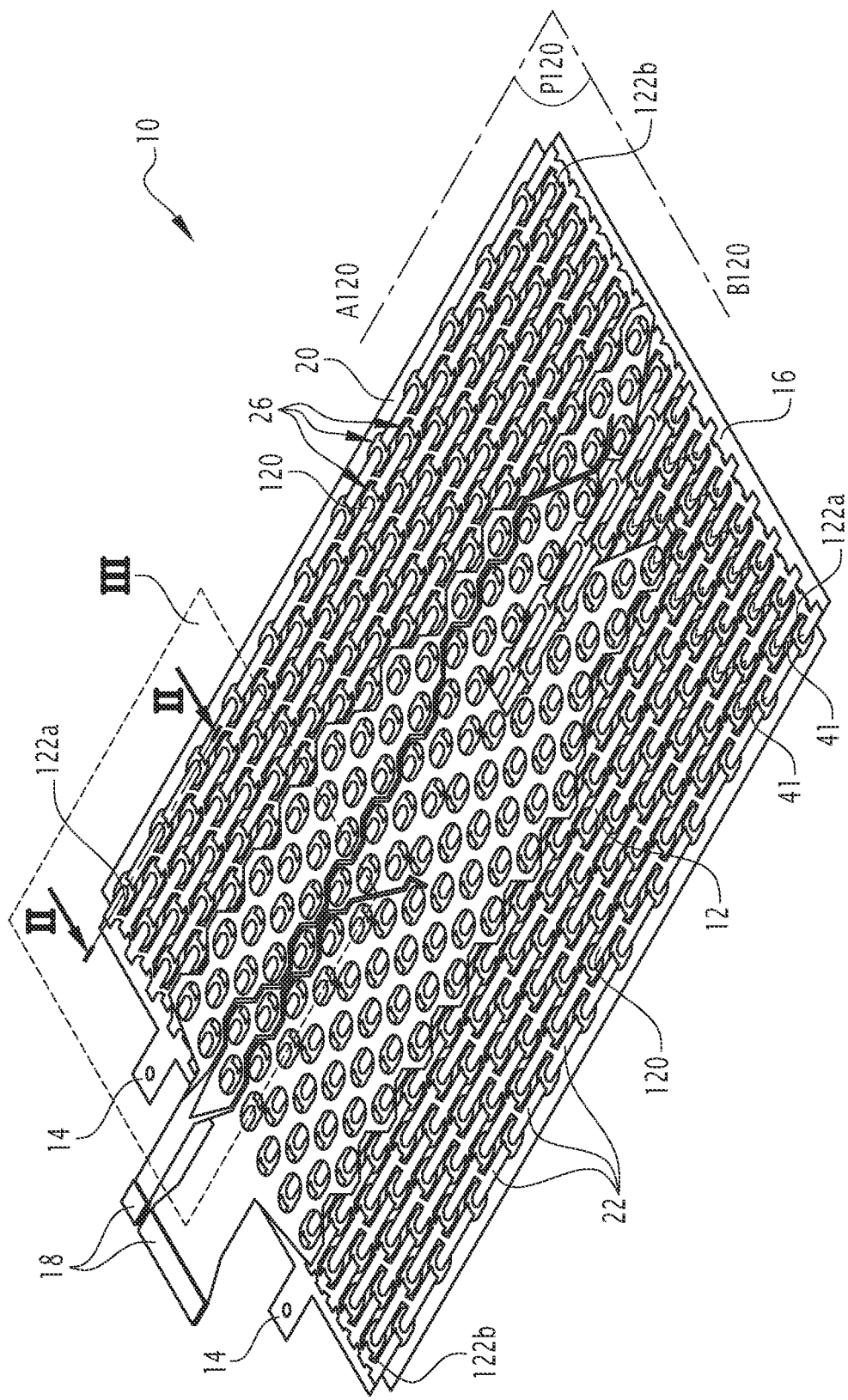
FIG. 1 is a perspective view of an exemplary laminated busbar in accordance with a first embodiment the invention, comprising two conductive bands.

Embodiments of the present invention will now be described with reference to the drawings, wherein like reference numerals are used to refer to like elements throughout. It will be understood that the figures are not necessarily to scale.

A first embodiment of the invention is described with reference to FIG. 1 to FIG. 6.

Battery packs, for purposes of this disclosure, include a plurality of series-connected battery elements. These battery elements may, in turn, include a parallel, series, or combination of both, collection of chargeable energy storage cells, usually rechargeable cells. Collectively all these cells store energy for the battery pack. The series-connected battery elements may, in turn be subdivided into collections of modules, each module including one or more series-connected battery elements, or cells.

Figure 2:
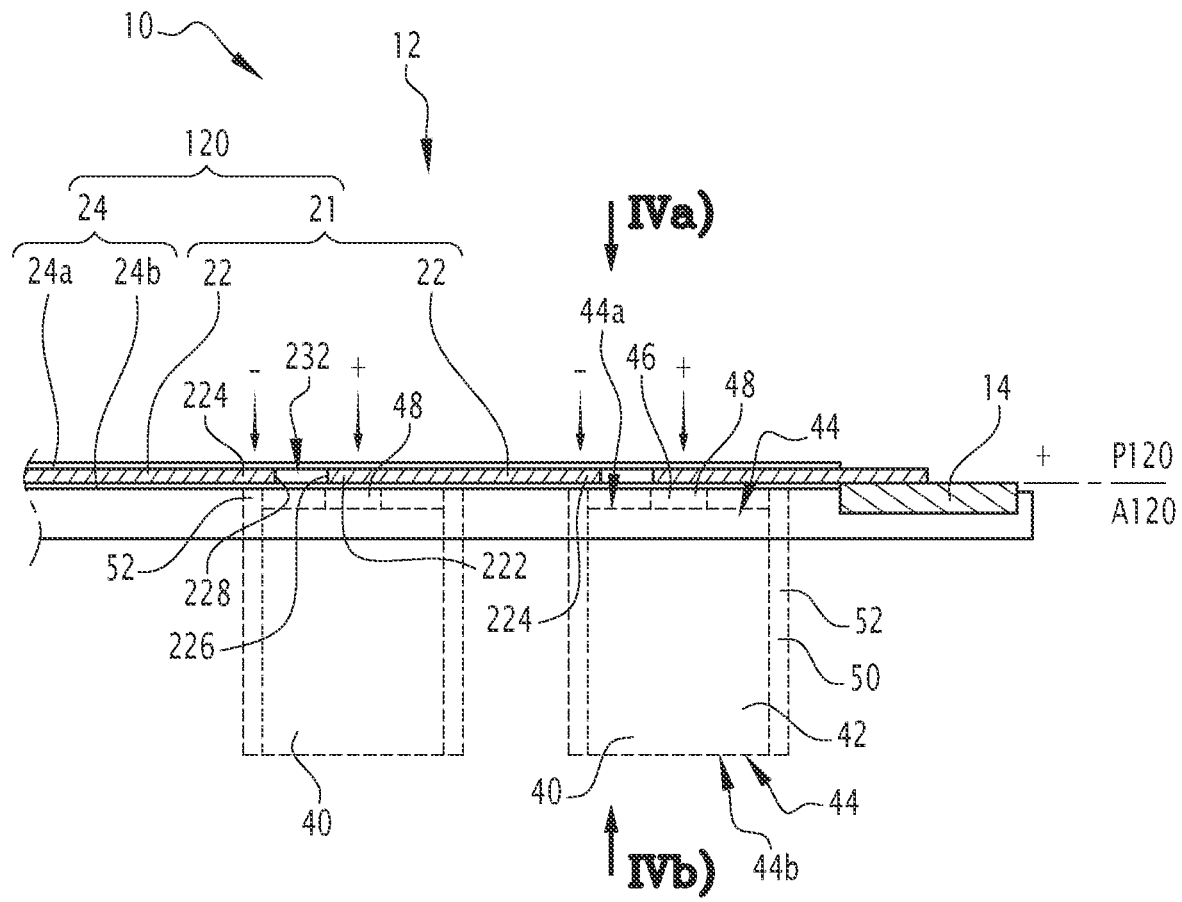
FIG. 2 is a sectional view of the busbar of FIG. 1, according to a cutting plan II-II.

With reference to FIGS. 1 and 2, a busbar 10 in accordance with the invention includes a thin laminated busbar 12 (laminated area), and termination conductors 14 for positive and negative connections. The busbar may optionally include a junction bar 16 for connecting multiple busbar sections together, and a monitoring element 18 for monitoring, for example, temperature and voltage of the busbar and/or batteries. A rigid plate 20 may also be included under the busbar to provide mechanical strength and facilitate welding operations.

The laminated busbar 12 refers to the thin laminated area of the busbar 10, while the termination conductors 14 and junction bar 16 are comparatively thicker and less flexible.

In the embodiment illustrated on FIG. 1, the laminated area 12 has a rectangular shape with a long side extending along a longitudinal axis A12 In the first embodiment of the busbar 10, the laminated area 12 comprises two complementary portions, each portion defining a laminated band 120 or laminated strip. The laminated area 12 of the first embodiments comprises therefore a pair of laminated bands 120, each configured to connect to a respective portion of an array of cells 40, or "cell array".

The longitudinal axis A12 is also a longitudinal axis, noted A120, for each laminated band 120. In other words, the longitudinal axes A120 of each conductive band 120 of the pair of conductive bands 120 are parallel to each other.

For each laminated band 120, the longitudinal axis A120 corresponds to a direction of serial connection of the cells 40 to be connected to said laminated band 120, while a direction of parallel connection of the laminated band 120 defines a transverse axis B120 of the conductive band. For explanatory purposes, a geometrical plane (noted P120° is defined by the longitudinal axis A120 and the transverse axis B120.

The direction of parallel connection depends on the specific arrangement of the cell array. In the shown example, the cells 40 are arranged in a staggered manner, and as a result, the transverse axis B120 is orthogonal to the longitudinal axis A120. However, in other non-illustrated arrangements of the cells 40, the transverse axis B120 might be oriented differently relatively to the longitudinal axis A120.

On FIG. 1, each laminated band 120 is configured to connect to thirteen cells 40 in parallel, along the transverse axis B120, and to connect to twelve cells 40 in series, along the longitudinal axis A120. The number of cells is not limiting and is given solely for explanatory purposes.

The cells 40 connected in parallel with each other define a row 41 of cells 40. Due to the staggered arrangement of the cells 40, the rows 41 are identified by a broken line on the figures. As a result, twelve rows 41 of thirteen cells 40 each are arranged along the longitudinal axis A120.

Each laminated band 120 extends along the longitudinal axis A120 and comprises two opposite extremity portions 122a and 122b. Said otherwise, each laminated band 120 comprises two opposite extremity portions 122a and 122b, which define the longitudinal axis A120 and the transverse axis B120 of said conductive band 120.

On FIG. 1, for each laminated band 120, the extremity portion 122a corresponds to a positive pole of the laminated band 120, and the extremity portion 122b corresponds to a negative pole of the laminated band 120.

In the first embodiments, the busbar 1 comprises a pair of two laminated bands 120, two termination conductors 14 and one junction bar 16.

The junction bar 16 is coupling together a two extremity portions 122a and 122b with opposite polarities, said two extremity portions 122a and 122b being aligned with each other along the transverse axis B120, each extremity portions 122a or 122b belonging to a respective laminated band 120.

In the illustrated example, the junction bar 16 two is coupling together a first extremity portion 122a of one of the laminated band 120 and a second extremity portion 122b of the other laminated band 120, said first and second extremity portions 122a and 122b being aligned along the transverse axis B120.

For each laminated band 120, one extremity portion 122a or 122b is coupled to a junction bar 16, and the other extremity portion 122b or 122a is coupled to a termination conductor 14.

In the illustrated example, the two extremity portions 122a and 122b that are coupled to a respective termination conductor 14 are aligned with each other along the transverse axis B120. In other words, each extremity portion 122a and 122b of one of the two conductive bands 120 is aligned, along the transverse axis B120, with a respective extremity portion 122b and 122a of the other conductive band 120.

On FIG. 2, two cells 40, represented in dashed lines, are connected in series with a busbar 10. The visible portion of the busbar 10 comprises a portion of a laminated band 120 and a termination conductor 14 connected to the extremity portion 122a of said laminated band 120, supported by a plate 20.

The cells 40 belong to the same array and are identical to each other. What is valid for one of the cells 40 of an array can be transposed for the other cells 40 of said array. The cells 40 are not part of the invention, but are described for explanatory purposes. The section plane of FIG. 2 plane is parallel to the longitudinal axis A120 of the laminated band 120. The two cells 40 are connected in series with each other.

Each cell 40 has a body 42, which is cylindrical with a circular section and comprises two opposite end-faces 44. The end-faces 44 are disk-shaped. One of the end-faces 44, called upper face 44a, comprises a central protuberance 46, which protrudes outwards from the body 42 and which corresponds to a positive pole 48 of said cell 44. The end face 44 opposite to the upper face 44a is called bottom face 44b.

Each cell 40 comprises also a peripheral connecting portion 50, which corresponds to a negative pole 52 of said cell 44. The positive pole 48 and the negative pole 52 are both accessible from the upper face 44a.

All the cells 40 from an array are oriented in the same direction, and the upper faces 44a of all the cells 40 from an array are geometrically borne in a single plane. The laminated area 12 is laid over the positive and negative poles 48 and 52 of each cells. For example, the laminated area 12 may be flat.

Terms such as "up", "down", "vertical", "horizontal", etc., are used for explanatory purposes, in order to describe the various elements of the busbar 10, and do not imply any limitation regarding the use of the busbar 10 in reality. For example, on FIGS. 1 and 2 the laminated area 12 of the busbar 10 is borne in a plane P120 that is supposed to be horizontal, while in reality the laminated area 12 might be oriented differently.

The laminated band 120 comprises a conductive layer 21 laminated on an insulating layer 24. Said otherwise, a conductive band 21 laminated on an insulating layer 24 form a laminated band 120. The conductive layer 21 configured to connect to the positive and negative poles of all cells 40 from an array, while respecting the series and parallel connections of each cell 40.

The insulating layer 24 is made from an insulating material in order to reduce the risk of circuit fault during use or during the assembly of the battery module. The insulating layer 24 comprises openings, that are arranged to allow the connection of the conductive layer 21 with the electrical poles of each cell 40 of the array. The openings are detailed further in FIG. 4.

The conductive layer 21 is composed of several conductors 22, where conductors 22 (which may thickness between 50 μm to 800 μm) of the conductive layer 21 are formed from copper, aluminum, nickel, and their alloys. A surface of the conductors 22 can be plated, for example, with tin, nickel or silver. The conductive layer 21 can be laminated between two insulation layers 24a, 24b. The insulation layers 24a, 24b may be formed from polymer materials, such as, for example, polyester, polyimide or other polymer materials. One side of the insulation layer 24a, 24b can be coated with adhesive, for the lamination, where a thickness of the adhesive is between 25 μm and 250 μm.

The adhesive material is not visible on the figures. The thickness of the adhesive material is preferentially between 12 μm and 250 μm. The adhesive material is chosen to remain insulating and flexible during the life of the busbar 10.

Each conductor 22 can also be formed from steel. In other words, each conductor 22 is a piece of an electrically conductive material, such as metal. Each conductor 22 is insulated from any other element when the busbar 10 is not assembled to any cell array. When the busbar 10 is assembled to a cell array, the conductors 22 of a conductive band 120 are electrically connected to each other through cells 40, as illustrated on FIG. 2.

The conductors 22 have the same thickness. The thickness of each conductor 22 is preferentially comprised between 50 μm to 1000 μm, which is thin enough so that the conductive layer 21 remains flexible. The thickness of the conductors 22 is adjusted according to the intensity of the electrical current passing through the conductors 22 when the busbar 10 is in use.

For example, the conductors 22 of the same conductive band 21 are made from a single sheet of metal, which is cut, perforated and laminated between the insulation layers 24a and 24b. In other words, each conductive band 21 is made from a pre-stamped metal coil. When the busbar 10 is connected to a cell array, the insulation layer 24B is located on the side of the cell array.

For example, in this specification, the insulation layer 24b is called "lower layer", while the insulation layer 24a is called "top layer", and is located on the top side of the laminated band 120.

The insulation layers 24a and 24b, are also flexible. As a result, the laminated bands 120 and the laminated busbar 12 are flexible, in order to conform to the cell array to which the busbar 10 is connected. The insulation layers 24a and 24b have holes, configured to allow, among others, the electrical connection of the conductors 22 with the cells 40. The holes are not visible on FIG. 2 in order to facilitate the reading of FIG. 2.

In the illustrated example, the two conductive bands 21 are laminated between the same insulations layers 24a and 24b and the two laminated bands 120 are attached to each other by the insulation layers 24a and 24b, so that the laminated area 12 is in one piece.

The laminated area 12 is therefore in one piece. Alternatively, each conductive band 21 can be laminated between two respective insulation layers 24a and 24b, the two laminated bands 120 being connected together by the junction bar 16.

In each laminated band 120, for each conductive band 21 of, each conductor 22 is arranged along the transverse axis B120, with two consecutive conductors 22 being periodically spaced from each other along the longitudinal axis A120.

In the illustrated example, the cells 40 are arranged along the transverse axis B120 in rows 41 that are in zigzags. In order to be connected to the cells 40, each conductor 22 has a specific shape with repetitive patterns that are periodically spaced from each other along the transverse axis B120, each pattern defining a cluster 220. On FIG. 3, some clusters 220 are delimited by a box drawn with in mixed lines. The clusters 220 of one conductor 22 pattern are arranged along the transverse axis B120, two consecutive clusters 220 of the same conductor 22 pattern being periodically spaced from each other along the transverse axis B120.

Each cluster 220 has a first terminal 222 and a second terminal 224 for connection to a respective energy storage device 40.

Each first terminal 222 and second terminal 224 of a cluster 220 is configured to connect to a respective energy storage device 40, and all first terminals 222 of the laminated busbar 12 are connectable to a first electric pole 48 of an energy storage device 40, while all second terminals 224 are connectable to a second electric pole 52 of an energy storage device 40.

In the illustrated example, each first terminal 222 is configured to be connected to the positive pole 48 of a respective cell 40, and each second terminal 224 is configured to be connected to the negative pole 52 of a respective cell 40.

Each first terminal 222 comprises a portion, called terminator 226, which is configured to be connected to the corresponding first terminal 48 of a cell 40 by welding. In the illustrated example, each first terminal 222 has an elongated body with a rounded end corresponding to a terminator 226.

Similarly, each second terminal 224 comprises a portion, called terminator 228, which is configured to be connected to the corresponding second terminal 52 of a cell 40 by welding. In the illustrated example, each terminator 228 presents a concave portion configured to follow the shape of the peripheral portion 50 of a cell 40.

Non limitative examples of welding technologies for connecting the busbar 10 to a cell array include hot spot, laser, or the like. Compared to known methods of connection, such as wire-bonding, the connection of the first and second terminals 222 and 224 to the cells 40 by welding offers a higher reliability, higher manufacturing speed and lower manufacturing costs. On FIG. 4, the dotted lines 230 illustrate an exemplary path followed by a welding tool to connect a terminator 226 or 228 to an individual cell 40.

Each cell 40 is therefore connected to a pair of terminators 226 and 228, the terminators 226 and 228 from the same pair being separated by a connection gap 232. The connection gap 232 depends of course on the geometry of the cells 40.

Figure 3:
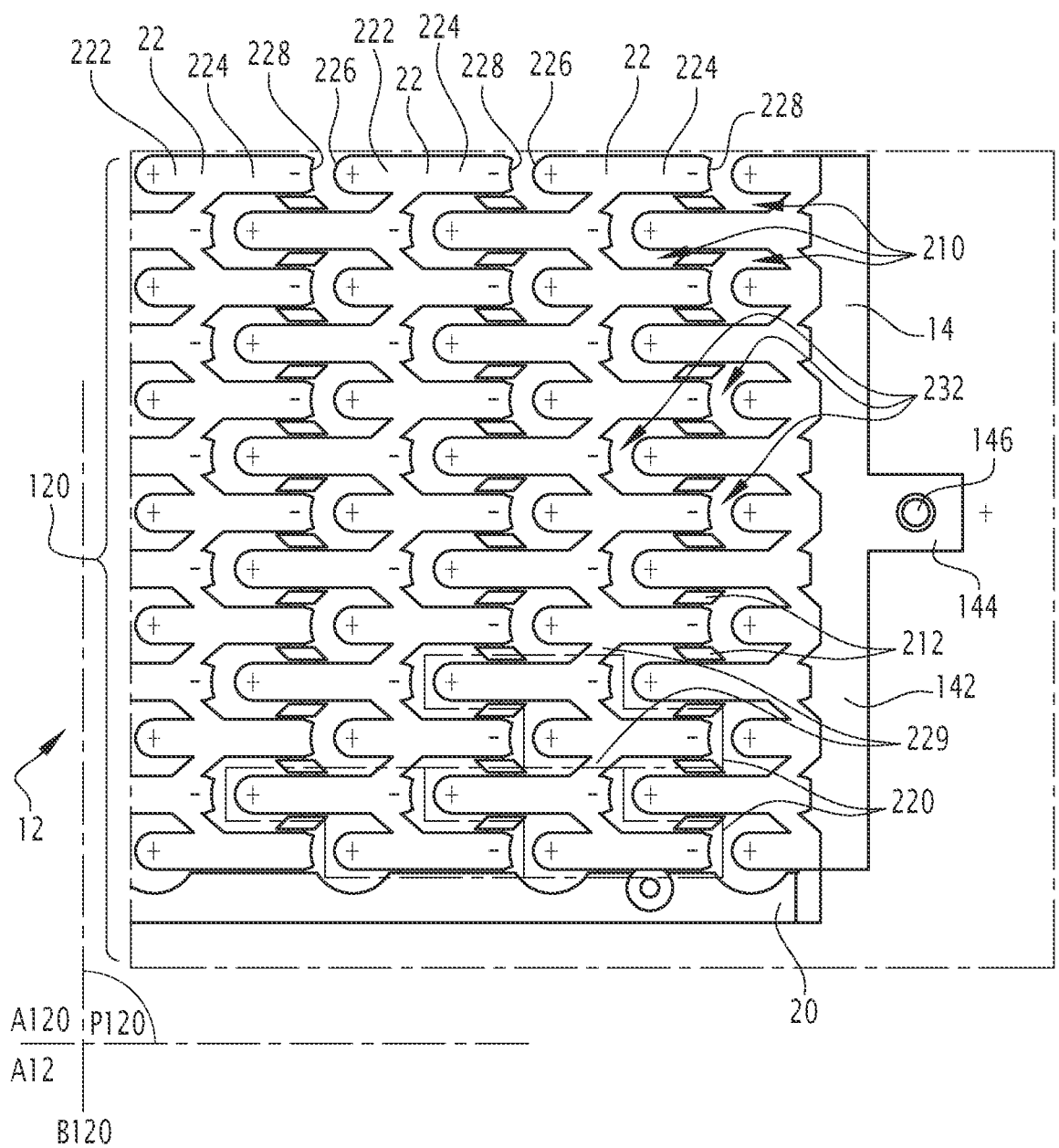
FIG. 3 is a top view of a detail III of the busbar of FIG. 1, illustrating a pattern of positive and negative conductors for thirteen cells.
Figure 4:
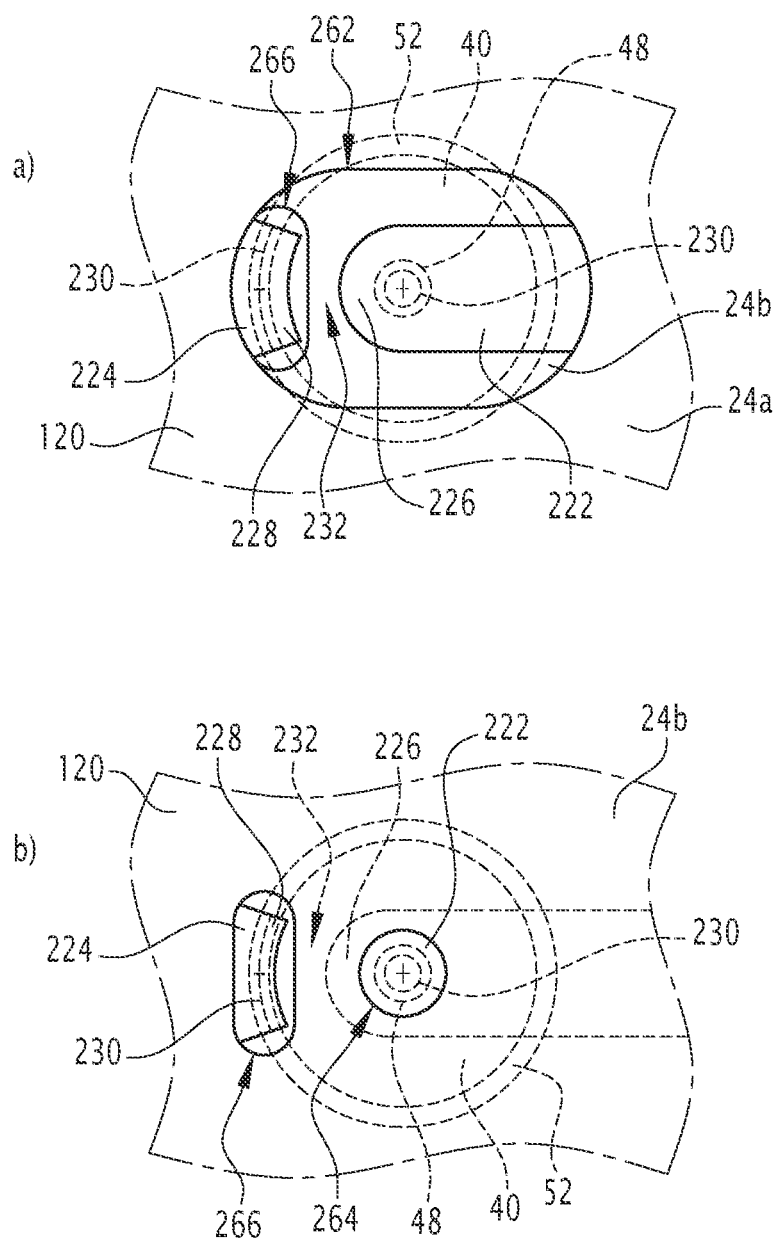
FIG. 4 is showing, respectively on two inserts a) and b), a top view and a bottom view of the busbar of FIG. 2, respectively identified by two arrows IV a) and IV b) on FIG. 2.

In the embodiment illustrated on FIG. 3, each cluster 220 has two first terminals 222 and two second terminals 224, in order to cooperate with the staggered pattern of the cell array.

Each conductor 22 comprises transverse links 229, configured to connect each cluster 220 of said conductor 22 between the terminators 226 and 228 of each first and second terminals 222 and 224. The number and disposition of the transverse links 229 depends on the geometry of the cell array and on the geometry of each cluster 220.

More generally, for a given module, the shape of each cluster 220, including the number of first and second terminals 222 and 224 within each cluster 220, can be adjusted depending on the specific arrangement of the cell array within said module.

For each conductive band 21, all the first terminals 22 are oriented toward one of the extremity portion 112a or 122b of said conductive band 21, while all the second terminals 224 are oriented toward the other extremity portion 122b or 122a of said conductive band 21. In the illustrated example; all the first terminals 222 of the clusters 220 of a conductive layer 21, to be connected to the positive pole 48 of a respective cell 40, are oriented toward the extremity portion 122b of said conductive layer 122b, while all the second terminals 224 are oriented toward the extremity portion 122a of said conductive layer 21

The conductors 22 of a conductive band 120 have all the same shape. In other words, each conductive band 120 comprises a succession of repeating conductor 22 patterns.

Termination conductors 14 are used to provide an interface to external equipment that is powered by the batteries coupled to the busbar 10. These termination conductors 14 may be in the form of conductive plates 142 formed, for example, from copper, aluminum, nickel, or their alloys. A thickness of the termination conductors 14 may be between 500 μm and 4000 μm, and these termination conductors 14 may be plated. The busbar 10 is composed of two termination plates 14, one for the positive connection and the other for the negative connection. Connection components 146, such as screws, studs and the like, can be added to the termination plate 142.

The thickness of the termination conductors 14 adjusted according to the intensity of the electrical current passing through the termination conductors 14 when the busbar 10 is in use.

Optionally, one or more junction bars 16 can be added to the busbar 10. The junction bars 16, which may be formed from the same materials as the termination conductors 14, can link two laminated areas 12 together. The termination conductors 14 and junction bars 16 can be connected to the laminated area 12 by mechanical action or welding (hot spot, laser, or the like).

In other words, each junction bar 16 may comprise conductive plates formed, for example, from copper, aluminum, nickel, or their alloys. A thickness of each junction bar 16 may be between 500 μm and 4000 μm, and each junction bar 16 may be plated. The thickness of each junction bar 16 is adjusted according to the intensity of the electrical current passing through this junction bars 16 when the busbar 10 is in use.

In the example illustrated on FIG. 1, the busbar 10 comprises one junction bar 16, linking together the two laminated bands 120 of the laminated area 12.

The busbar 10 in accordance with the invention is configured to enable interconnection between cylindrical cells. In this regard, cells are disposed in a staggered arrangement to optimize space utilization. The busbar 10 configuration can be easily adapted to different cell sizes (18500, 21700 or others).

In this example, all cells 40 interconnected to one busbar 10, that is to say all the cells 40 of the same array, have the same diameter, and the location of the electric poles 48 and 52 is the same, on the upper face 44a, for each of these cells.

With respect to FIG. 3, a portion of one of the laminated busbar 12 connected to one termination conductor 14 are shown at lower scale.

The plate 20 is made from a rigid and electrically insulating material, for example from injected polymer. The plate 20 comprises guiding holes 210, each guiding hole 210 having a circular section and being configured to receive one cell 40. The cells 40 are not shown on FIG. 3. When a cell 40 is lodged in a guiding hole 210, the positive pole 48 of said cell 40 is centered relatively to the guiding hole 210, while the negative pole 52 is located at the periphery of said guiding hole 210.

As an option, the plate 20 can also comprise spacers 212, configured to mechanically maintain the cells 40 of an array in their vertical position. The relative positions of the cells 40 with each other, and the relative disposition of the positive and negative poles 48 and 52 of each cell 40, therefore depend on the geometry of the plate 20.

In this regard, cells are preferably disposed in a staggered arrangement to optimize space utilization. The busbar 10 configuration can be easily adapted to different cell sizes, as long as the cells 40 are cylindrical cells with both positive and negative poles 48 and 52 located on the same face. For example, the size of the spacers 212 might be adjusted to improve or reduce cooling, depending on the sensitivity of the cells 40. The principles described here for a staggered pattern with specific aspect ratios, along the longitudinal and transverse axis A120 and B120, can easily be adjusted, by a skilled person, for different aspect ratios.

Conductors 22 of the conductive layer 21 enable a number (x) of cells 40 to be connected by the negative poles 52 and distribute the current to x other cells by the positive poles 48. FIG. 3 illustrates an example with x=13 (the number x is defined by the module configuration).

Said otherwise, in the illustrated example each conductor 22 of the conductive layer 21 has thirteen first terminals 222 and thirteen second terminals 224, each first terminal 222 and second terminal 224 being configured to connect to a respective energy storage device, or cell 40.

When the busbar 10 is in use, the thirteen cells 40 connected to the first terminals 222 of a conductor 22 are connected with each other in parallel, the thirteen cells 40 connected to the second terminals 222 of the same conductor 22 are connected with each other in parallel. The thirteen cells 40 connected to the first terminals 222 of a conductor 22 are connected in series with the thirteen cells 40 connected to the second terminals 224 of the same conductor 22.

In the illustrated example, the first and second terminals 222 and 224 of each conductor 22 are arranged in a repetitive pattern, in other words clusters 220, along the transverse axis B120. Two consecutive clusters 220 of the same conductor 22 are periodically spaced from each other along the transverse axis B120.

All clusters 220 have the same number of first and second terminals 222 and 224, each first terminal 222 and second terminal 224 of a cluster 2220 being configured to connect to a respective energy storage device, or cell 40. In the illustrated example, in order to cooperate with the staggered pattern of the plate 20 configured to hold the cell array, each cluster 220 has two first terminals 222 and two second terminals 224. For each conductive band 120, all the first terminals 222 are oriented toward one of the extremity portion 122a or 122b of said conductive band 120, while all the second terminals 224 are oriented toward the other extremity portion 122b or 122a of said conductive band. In the illustrated example, the first terminals 222 are oriented toward the negative pole 122b, while the second terminals 224 are oriented toward the positive pole 122a.

Of course, the number of first and second terminals 222 and 224 per cluster 220, or the shape of each cluster 220 might change depending on the specific geometry of the plate 22 configured to hold the cell array.

Each row 41 of cells 40 is connected, through a conductor 22, to another row of cells 41. More precisely, the positive pole 48 of each cell 40 of a row 41 are connected, through a conductor 22, to the negative poles 52 of each cell 40 of another row 41. All conductors 22 of a laminated band 120 have therefore the same number of first and second terminals 222 and 224. Furthermore, since all conductors 22 have the same shape, each conductor 22 has also the same number of clusters 220.

It is therefore possible to adapt to different sizes of cell array, assuming of course that the cells 40 are arranged the same way, for example with the same spacing along the longitudinal axis A120 and along the transverse axis B120, by simply adjusting the number of conductors 22 of the laminated band 120, and by simply adjusting the number of clusters 220 per conductor 22.

Adjusting the number of conductors 22 adjusts the number of cells 40 to be connected in series, and adjusting the number of clusters 220 per conductor 22 adjusts the number of cells to be connected in parallel.

Figure 5:
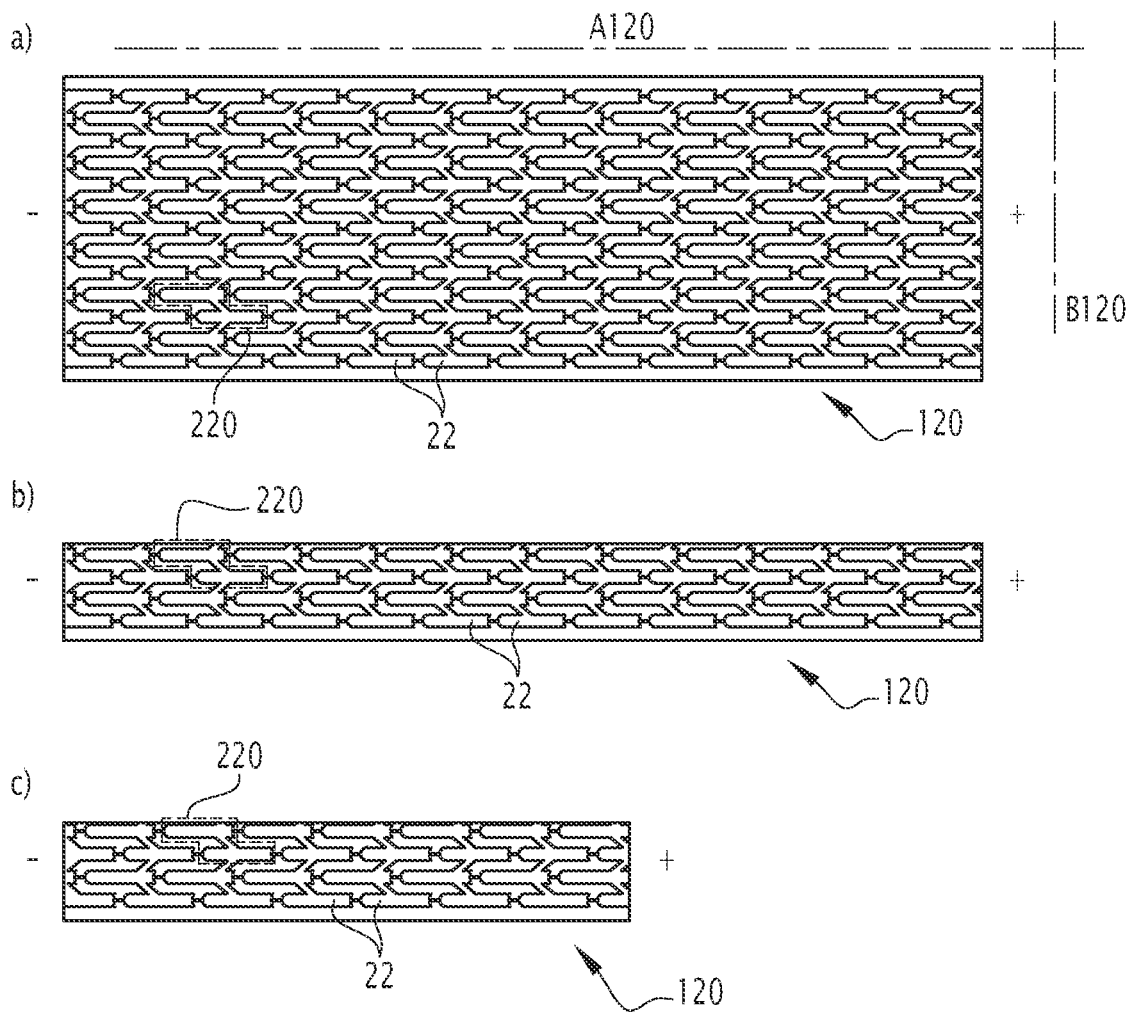
FIG. 5 is showing, on three inserts a), b) and c), a conductive band of the busbar of FIG. 1, the conductive band cut into portions of different sizes on each insert.

With additional reference to FIG. 5, the laminated area 120 is a succession of the same conductor 22 pattern, where the number of conductors 22 and the voltage per battery cell 40 defines the module voltage. The conductive raw material is a succession the same conductor 22 pattern, forming a band 21 that can have infinite length.

Of course, practically the length of the conductive band 120 might be limited by the raw materials used during the manufacturing process. For example, the insulating layer 22a or 22b might be available in rolls, which have finite length. The laminated band 120 is produced continuously and is cut to adapt to a specific cell array, provided of course that the geometry of this cell array, which is determined by the geometry of the base plate 20, corresponds to the geometry of the conductive layer 21 of said laminated band 120.

For a conductive band 120, a band width is defined by the number of cells 40 connected in parallel (x) along the transverse axis B120, while a band length is defined by the number of cells 40 connected in series along the longitudinal axis A120.

During manufacturing of the laminated band 120, a continuous band is produced continuously, the band width and band length being or course limited by the manufacturing equipment available and/or the packaging of the material used for the conductive layer 21 and for the insulation layers 24a and 24b. The continuous band is cut at the desired band width and band length only when the actual size of the cell array is known. The piece of continuous band that is cut at the proper length and width becomes a laminated band 120, which will be actually used in a busbar 10. In this sense, the continuous band is a "raw material", which must be further processed to become an actual laminated band 120.

FIG. 5 shows, on three inserts a), b) and c), three different sizes of conductive bands 120 that can be obtained after cutting a bigger continuous band. FIG. 5a) shows one of the conductive band 120 of the laminated busbar 12, which has a band length of twelve cells and a band width of thirteen cells 40.

It is possible to split this raw material in several smaller bands 120. The band width is defined by the number of cells 40 in parallel (x). FIG. 5b) and c) show such smaller "split" band. The length of the band is defined by the number of cells that are in series and defines the voltage. The band 120 can be mechanically cut or cut via other processes. FIGS. 5b) and 5c) illustrate two examples of cut bands, where FIG. 5b) shows twelve cells 40 in series and four cells 40 in parallel, and FIG. 5c) shows seven cells 40 in series and four cells 40 in parallel.

The laminated band 120 cut from the continuous band is further fitted with the termination conductors 14 and, when the busbar 10 comprises two laminated bands 120 as in the illustrated example, with a junction bar 16. Such a production method of the busbar 10 is very cost effective, since a busbar 10 can easily be produced for any size of cell array, without using any order-made components.

When the laminated area 12 comprises a pair of two laminated bands 120, as in the first embodiment, the two laminated bands 120 have preferably the same band width. In other words, each conductor 22 of the pair of two laminated bands 120 have the same number of clusters 220. As a result, each conductor 22 of one of the laminated bands 120 of said pair is aligned, along the transverse axis B12), with a respective conductor 22 of the other laminated band 120 of said pair.

Similarly, the two laminated bands 120 have preferably the same band length. In other words, each laminated band 120 has the same number of conductor 22. Each extremity portion 122*a* or 122*b* of one of the laminated bands 120 of said pair is aligned, along the transverse axis B120, with a respective extremity portion 122*b* or 122*a* of the other laminated band 120 of said pair. As a result, he two termination connectors 14 are aligned with each other along the transverse axis B120.

Insulation layers 24*a*, 24*b*, and optionally monitoring element 18, can be laminated on each side of the conductive layer 21. Holes 26 are cut in the insulation layers 24*a*, 24*b* to allow the welding operation, as can be best seen in FIG. 4.

Alternatively, two or more monitoring elements 18 can be laminated on the conductive layer 21 of each laminated band 120.

FIGS. 4*a*) and 4*b*) show the two sides of a laminated band 120. A cell 40 is represented in dashed lines. On FIG. 4*a*), the cell 40 is seen through the laminated band 120, while on FIG. 4*b*), the cell 40 is transparent.

In the illustrated example, the holes 26 include first holes 262, which are arranged in the upper layer 24*a*, and second holes 264 and third holes 266, which are arranged in the bottom layer 24*b*.

Each first hole 262 allows access, from the top side of the laminated band 120, to the first and second terminals 222 and 224 to be connected to one of the cells 40. More precisely, each first hole 262 allows access to the terminator 226 of the first terminal 222 and to terminator 228 of the second terminal 224, so the welding apparatus can weld the terminators 226 and 228 to the respective positive or negative pole 48 or 52 of the cell 40. In the illustrated example, each first hole 262 has an elongated shape.

Figure 6:
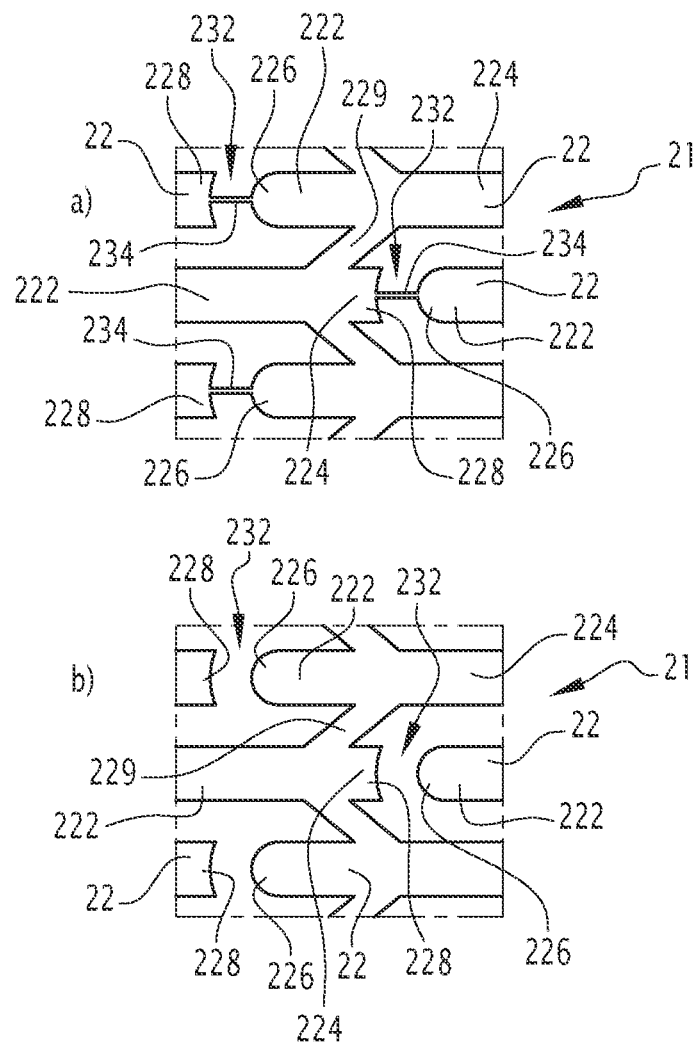
FIG. 6 is showing, on two inserts a) and b), a detail of a conductible band of the busbar of FIG. 1 at two different stages of the manufacturing of the busbar.

Each first hole 262 also allows access to the gap 232 between the two terminators 226 and 228 connected to the cell 40, for reasons relative to the manufacturing of the laminated band 120, these reasons being explained further in the present description, with respect to FIG. 6.

Each second hole 264 allows access, from the down side of the laminated band 120, to the first terminal 222 to be connected to the positive pole 48 of a cell 40. More precisely, each second hole 264 allows access to the terminator 226 of the first terminal 222, so that when the laminated band 120 is laid on the top of a cell array, during the welding operation the terminator 226 is physically in contact with the first pole 48. After the welding operation, the terminator 226 is welded to the first pole 48 of a cell 40, as shown by the weld 230.

In the example illustrated on FIG. 4*b*), the second hole 264 is round, and has preferentially a diameter that is equal to or greater than a diameter of the first pole 48 of a cell 40.

Each third hole 266 allows access, from the down side of the laminated band 120, to the second terminal 224 to be connected to the negative pole 52 of a cell 40. More precisely, each third hole 266 allows access to the terminator 228 of the second terminal 224, so that when the laminated band 120 is laid on the top of a cell array, during the welding operation the terminator 228 is physically in contact with the first pole 48. After the welding operation, the terminator 228 is welded to the first pole 48 of a cell 40, as shown by the weld 230.

In the example illustrated on FIG. 4*b*), the third hole 266 is an elongated hole, in order to adapt to the shape of the negative pole 52 of a cell 40.

The shapes and sizes of the first, second and third holes 262, 264 and 266 are not limited. The holes 26 are kept as small as possible in order to reduce the risk of electrical fault when connecting the busbar 10 to a cell array, since the cells 40 usually contain some electrical energy upon manufacturing. For example, each first hole 262 can be replaced by two or more openings, as long as these openings allow the access to the gap 232 and to the terminators 226 and 228 for the welding of the terminators to the poles 48 and 52 of a cell 40. Each second and third holes 264 and 266 allowing access to the first and second terminals 222 and 224 to be connected to the same cell 40 can also be replaced by a single bigger opening.

FIG. 6 illustrates, with respect to the inserts 6*a*) and 6*b*), the same portion of the conductive layer 21 shown in two different configurations, which corresponds to two different stages of the manufacturing process of the laminated band 120.

On FIG. 6*a*), the conductive layer 21 is shown in a configuration before being laminated on any of the insulation layers 24*a* and 24*b*. At each connection gap 232 between a pair of terminators 226 and 228, said terminators 226 and 228 are connected together by a bridge 234. In other words, all the conductors 22 of the conductive layer 21 are still linked with each other by the bridges 234 before the conductive layer 21 is laminated on an insulation layer 24*a* or 24*b*. This illustrates the fact that the conductive layer 21 is arranged from a single sheet of metal, which is stamped to form the conductive layer 21 that comprises the conductors 22 linked by the bridges 234. Thanks to the bridges 234, the spacing between terminators 226 and 228 of each pair is precisely defined and does not vary during the following lamination step.

In the illustrated example, each bridge 234 is a strip of metal that extends along the longitudinal axis A120.

After the stamping of the sheet of metal, the conductive layer 21 is laminated on one of the insulation layers 24*a* or 24*b*. As a result, the conductors 22 adhere to the insulation layer 24*a* or 24*b* on which they are laminated, and the bridges 234 can be removed. In the illustrated example, the conductive layer 21 is first laminated on the upper layer 24*a*, where each first hole 262 allows access to a respective connection gap 232, where a bridge 234 is located.

As non-limitative examples, the bridges 234 can be removed by punching, by grinding, by laser cutting, etc.

After removal of the bridges 234, the conductive layer 21 is in the configuration shown on FIG. 6*b*), which is the final configuration of the conductive layer 21, in other words the configuration of the conductive layer 21 when the busbar 10 is finished and ready to be assembled to a cell array.

After removal of the bridges 234, the conductive layer 21 can be laminated on the lower insulation layer 24*b*).

At each extremities 122*a* and 122*b* of the conductive band 120, positive and negative termination conductors 14 are fixed (welded or other process) for the interface with the battery system. If required by the module size, it is possible to split the band 120 in two or more parts to reduce the final length of the busbar 10. In this case, one or more junction bars 16 can be used to connect two bands 120 together. This is illustrated in FIG. 1, where the top layer 12 is split in half and joined by the junction bar 16. The thickness of the junction bar 16 is defined by the current density it must endure without overheating. The junction bar 16 can be fixed to the conductive bands 120 by mechanical action or welding. The junction bar 16 is useful to bring in the same side the positive and negative connection.

Figure 7:
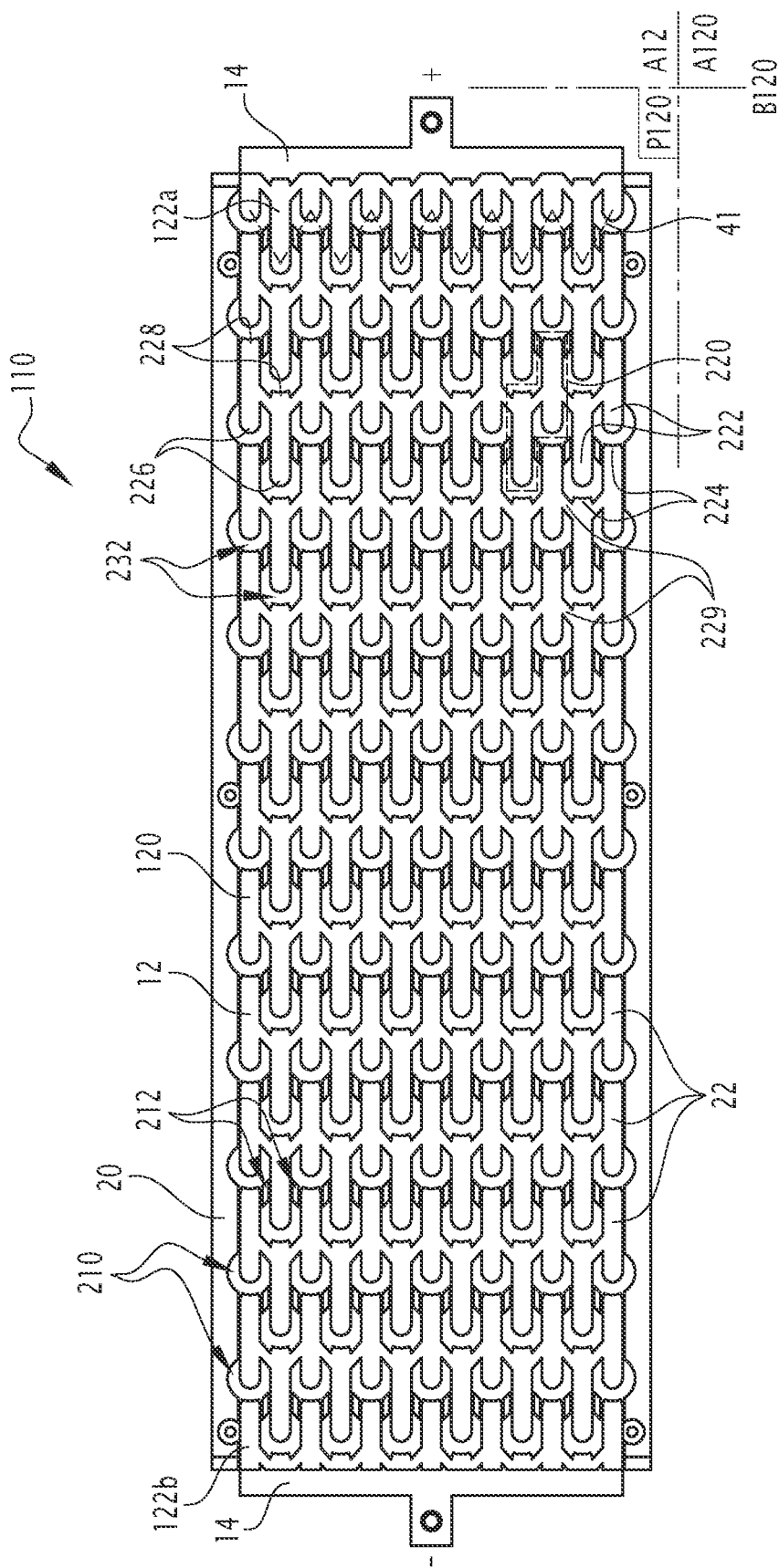
FIG. 7 is a top view of an exemplary laminated busbar in accordance with a second embodiment the invention, comprising one conductive bands.

A second embodiment of the invention is described with reference to FIG. 7, showing a busbar 110.

A main difference of the busbar 110 with the busbar 10 from the first embodiment is that the laminated area 12 of the busbar 110 comprises a single laminated band 120, and no junction bar 16. The two extremity portions 122a, 122b of the laminated band 120 are each connected to a respective termination conductor 14.

It is therefore possible to have the two termination conductors 14 on the same side of the laminated area 12, as shown in the first embodiment, of on opposite sides of the laminated area 12, as shown in the second embodiment.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

Having described the invention, the following is claimed:

1. A laminated busbar for interconnecting electrical storage devices, comprising:
    an insulating layer;
    at least one conductive band arranged on the insulating layer, the at least one conductive band comprising a succession of repeating conductor patterns, each conductor pattern defining a cluster having a first terminal and a second terminal for connection to an energy storage device; and
    a first terminator coupled to the first terminal and a second terminator coupled to the second terminal, the first and second terminators configured to connect to terminals of the energy storage device,
    wherein each conductive band is made from pre-stamped metal coil,
    wherein the insulating layer comprises a top layer and a bottom layer, wherein each conductive band is laminated between the top layer and the bottom layer, the conductive band and the top and bottom layers forming a laminated band,
    wherein each one of the top and bottom layers comprises openings, configured to allow access to each terminator from both sides of the laminated band,
    wherein two terminators configured to connect to the same energy storage device define a connection gap,
    wherein at least one of the top or bottom layers comprises first openings, which are each configured to allow access to a respective connection gap,
    wherein the at least one conductive band is arranged along a longitudinal axis and comprises two opposite extremity portions,
    wherein each conductor is arranged along a transverse axis, two consecutive conductors being periodically spaced from each other along the longitudinal axis,
    wherein each conductor has the same number of clusters, the clusters of one conductor being arranged along the transverse axis, two consecutive clusters of a same conductor pattern being periodically spaced from each other along the transverse axis,
    wherein all first terminals of the laminated busbar are connectable to a first electric pole of an energy storage device, while all second terminals are connectable to a second electric pole of an energy storage device,
    wherein each extremity portion is configured, when connected to a respective energy storage device, to have a polarity opposite to the other extremity portion and is configured to connect to a termination conductor or to a junction bar,
    wherein the busbar comprises a laminated busbar and two termination conductors,
    wherein the laminated busbar comprises one laminated band, wherein the two extremity portions of said one laminated band are each connected to a respective termination conductor,
    wherein the laminated busbar comprises a pair of two laminated bands, two termination conductors and a junction bar,
    wherein the longitudinal axes of each conductive band of said pair are parallel to each other,
    wherein at least one conductor and at least one extremity portion of one laminated band of said pair are aligned, along the transverse axis, respectively with a conductor and with an extremity portion of the other conductive band of said pair,
    wherein the two extremity portions that are aligned with each other along the transverse axis have opposite polarities,
    wherein the two extremity portions that are aligned along the transverse axis are coupled together by a junction bar,
    wherein the other two extremity portions are each configured to be coupled to a respective termination conductor.

2. The laminated busbar according to claim 1, wherein for each conductive band, all the first terminals are oriented toward one of the extremity portions of said conductive band, while all the second terminals are oriented toward the other extremity portion of said conductive band.

3. The laminated busbar according to claim 1, wherein each conductor comprises transverse links, each transverse link connecting a cluster of a conductor to the first and second terminals of another cluster of a same conductor.

4. The laminated busbar according to claim 1, wherein the first openings are arranged in the top layer, each first opening allowing access to the connection gap between a pair of terminators configured to be connected to the same energy storage device, each first opening being also configured to allow access to the terminators of said pair.

5. The laminated busbar according to claim 4, wherein the bottom layer comprises second and third openings,
    wherein each second opening allows access to a first terminator of a pair of terminators, so that said first terminator can be weld to the positive pole of said energy storage device, wherein each third opening allows access to a second terminator of said pair, so that said second terminator can be weld to the negative pole of said energy storage device.

6. The busbar according to claim 1, wherein each laminated band of the pair of two laminated bands has the same number of conductors, wherein each conductor of the pair of two laminated bands has the same number of clusters.

* * * * *